G. R. D. MASTERS.
WHEEL HUB.
APPLICATION FILED APR. 21, 1919.
1,317,090.
Patented Sept. 23, 1919.
2 SHEETS—SHEET 1.
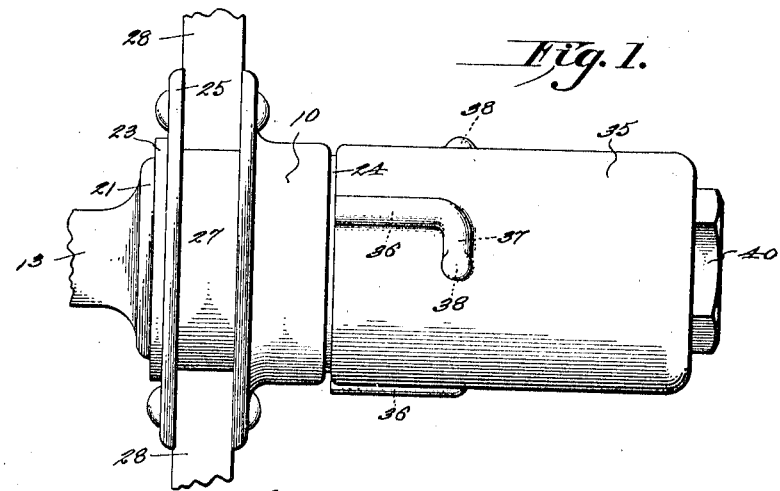
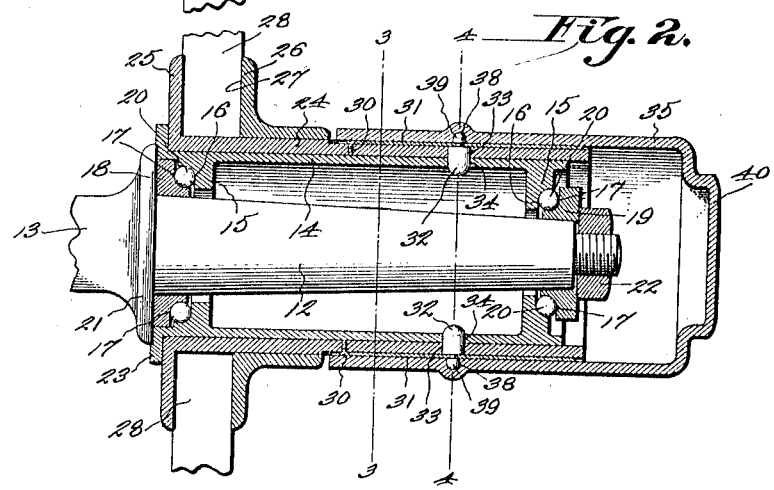
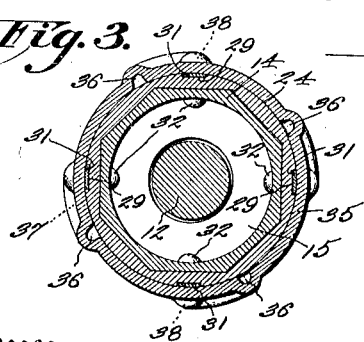
Witnesses
M. Mare. Duvall
Inventor
Geo. R. D. Masters,
By Victor J. Evans
Attorney

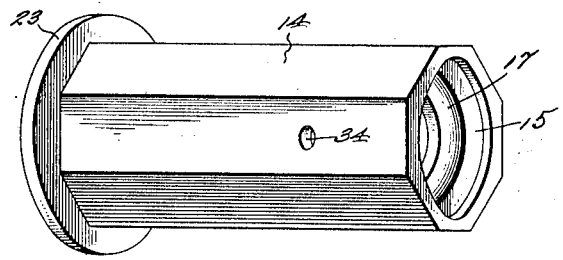
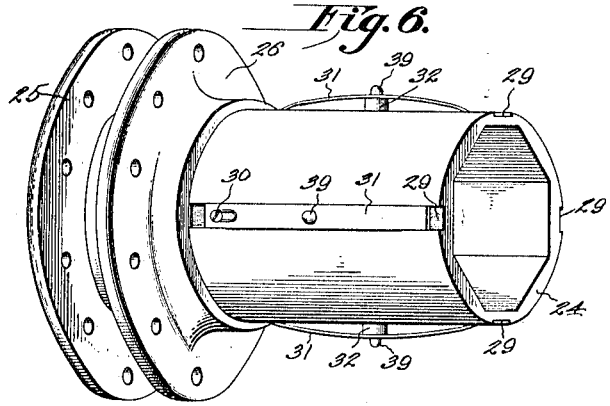
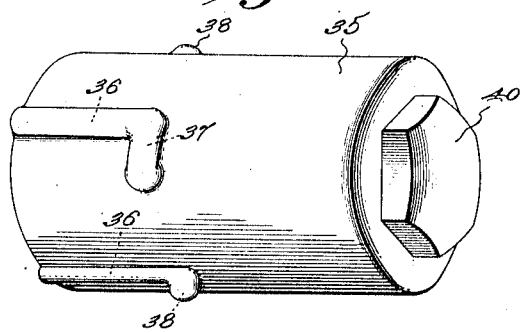

UNITED STATES PATENT OFFICE.

GEORGE R. D. MASTERS, OF CHARLOTTESVILLE, INDIANA.

WHEEL-HUB.

1,317,090.  Specification of Letters Patent.  Patented Sept. 23, 1919.

Application filed April 21, 1919. Serial No. 291,422.

*To all whom it may concern:*

Be it known that I, GEORGE R. D. MASTERS, a citizen of the United States, residing at Charlottesville, in the county of Hancock and State of Indiana, have invented new and useful Improvements in Wheel-Hubs, of which the following is a specification.

This invention relates to improvements in hubs, especially designed for vehicle wheels and aims to provide a hub which is simple, strong and durable of construction and which may be quickly taken apart or assembled.

To this end the invention includes a hub which includes an inner sleeve adapted to be rotatably mounted upon anti-friction bearings upon an axle spindle, the said sleeve having mounted thereon an outer sleeve which is held against rotation and carries means for engagement with the wheel spokes, a cap being removably positioned over the outer sleeve, while a novel form of fastening means is employed for holding the outer and inner sleeves and the cap assembled.

The invention also includes the following novel features and details of construction, to be hereinafter more fully described and illustrated in the accompanying drawings.

In the drawings:

Figure 1 is a side elevation of a hub embodying the present invention, the adjacent ends of the wheel spokes being shown connected thereto.

Fig. 2 is a central longitudinal sectional view of the same.

Fig. 3 is a transverse section on the line 3—3 of Fig. 2.

Fig. 4 is a similar view on the line 4—4 of Fig. 2.

Fig. 5 is a detail perspective view of the inner sleeve.

Fig. 6 is a similar view of the outer sleeve.

Fig. 7 is a like view of the cap.

Referring to the drawings in detail, wherein like characters of reference denote corresponding parts, the hub is indicated in its entirety by the reference character 10. This hub is shown as mounted upon a spindle 12 of a vehicle axle 13 and comprises an inner sleeve 14, which surrounds the spindle and has located upon its interior near each end thereof, an annulus 15, which is formed with an annular groove 16, which groove, together with a groove 17 formed on inner and outer rings 18 and 19, provide race-ways for anti-friction balls 20. The ring 18 bears against a flange 21 provided at the inner end of the spindle and is held against movement in an opposite direction by the annulus 15, while the ring 19 is adjustably held in position through the medium of a nut 22 mounted upon the reduced threaded end of the spindle 12. By this means the bearing may be properly regulated. The inner end of the sleeve 14 is provided with an annular flange 23, while the outer surface of the said sleeve is of rectangular cross sectional shape, preferably octagonal.

Mounted upon the sleeve 14 is an outer sleeve 24, the interior of which is shaped to conform to the outer surface of the inner sleeve, upon which it has a snug working fit. The inner end of the sleeve 24 is provided with an annular flange 25, which together with a removable or adjustable ring 26, forms an annular groove 27, for the reception of the inner ends of the spokes 28, which may be secured in any desired manner. The outer periphery of the sleeve 24 is provided with spaced longitudinally disposed grooves 29, there being preferably four of these grooves. Secured within the grooves through the medium of fastening devices 30, are opposite ends of a bowed flat spring 31, which spring when depressed is seated within the groove 29 and substantially flush with the periphery of the sleeve 24. Secured central of the ends of the springs 31 and to the undersurface thereof, are lugs or projections 32, which, when the springs are depressed, pass through openings 33, formed in the sleeve 24 and enter openings 34 formed in the sleeve 14, these openings registering when the sleeves are in assembled position, so that the lugs prevent relative longitudinal movement of the inner and outer sleeves, while the shape of their meeting surfaces prevents relative rotary movement.

Mounted upon the outer end of the sleeve 24, is a cap 35, which is provided upon its interior with spaced longtitudinally extending grooves 36, whose inner ends communicate with relatively short right angularly arranged grooves 37, the ends of these last mentioned grooves being provided with depressions or pockets 38. The number of grooves 36 corresponds with the number of springs 31 and mounted upon these springs and extending in a direction opposite to that of the lugs 32, are relatively short lugs 39. These last mentioned lugs are adapted to enter the grooves 36 and 37 and to be seated in the depressions 38, being yieldingly held in these depressions through the action of the springs 31. The lugs 39 are provided with rounded tops, so that when sufficient pressure is exerted the cap may be rotated to unseat the lugs for the purpose of removing the said cap. To facilitate this the outer end of the cap is provided with a rectangular wrench receiving projection 40. Upon the removal of the cap 35, the lugs 32 will be withdrawn by means of the springs 31 from engagement with the openings 34 in the sleeve 14, so that the sleeve 24 may be removed therefrom.

It is believed that from the foregoing description and the accompanying drawings the construction operation and advantages of the invention will be apparent.

Various changes may be made in the form, proportions and minor details of construction and the right is herein reserved to make such changes as properly fall within the scope of the appended claims.

Having described the invention, what is claimed is:

1. The combination with a spindle, of a hub comprising an inner sleeve, an outer sleeve mounted thereon, means carried by the outer sleeve for engagement with the spokes of a wheel, a cap mounted upon the outer sleeve and spring actuated means for holding the inner and outer sleeves and the cap in assembled position.

2. The combination with a spindle, of a hub comprising an inner sleeve, an outer sleeve mounted thereon, means carried by the outer sleeve for engagement with the spokes of a wheel, a cap mounted upon the outer sleeve and spring actuated means carried by the outer sleeve and engageable with both the inner sleeve and the cap for holding the parts assembled.

3. The combination with a spindle, of a hub comprising an inner sleeve, an outer sleeve mounted thereon, means carried by the outer sleeve for engagement with the spokes of a wheel, a cap mounted upon the outer sleeve, leaf springs secured longitudinally of the outer sleeve and lugs carried by said springs and engageable with both the inner sleeve and cap for holding the parts assembled.

4. The combination with a spindle, of a hub comprising an inner sleeve, an outer sleeve mounted thereon, means carried by the outer sleeve for engagement with the spokes of a wheel, a cap mounted upon the outer sleeve, leaf springs secured longitudinally of the outer sleeve, lugs carried by the said sleeve and engageable with openings in the inner and outer sleeves for removably holding the same together and means also carried by the said springs and removably engaging the cap for holding the latter upon the outer sleeve.

5. The combination with a spindle, of a hub comprising an inner sleeve, an outer sleeve mounted thereon, means carried by the outer sleeve for engagement with the spokes of a wheel, a cap mounted upon the outer sleeve, leaf springs secured longitudinally of the outer sleeve, lugs carried by the said springs and engageable with openings in the inner and outer sleeves for removably holding the same together and lugs also carried by said springs and engageable with grooves in the cap for removably holding the latter in position.

6. The combination with a spindle, of a hub comprising an inner sleeve, an outer sleeve mounted thereon, means carried by the outer sleeve for engagement with the spokes of a wheel, a cap mounted upon the outer sleeve, leaf springs secured longitudinally of the outer sleeve, lugs carried by the said springs and engageable with openings in the inner and outer sleeves for removably holding the same together, lugs also carried by said springs and engageable with openings in the sleeves and pockets located at the inner extremity of grooves in the cap to prevent accidental misplacement of the cap and sleeves.

In testimony whereof I affix my signature.

GEO. R. D. MASTERS.

Copies of this patent may be obtained for five cents each, by addressing the "Commissioner of Patents, Washington, D. C."